(12) United States Patent
Posa et al.

(10) Patent No.: US 9,201,412 B2
(45) Date of Patent: Dec. 1, 2015

(54) WIRELESS REMOTE WITH CONTROL CODE LEARNING

(76) Inventors: John G. Posa, Ann Arbor, MI (US); Lawrence J. Karr, Santa Monica, CA (US)

( * ) Notice: Subject to any disclaimer, the term of this patent is extended or adjusted under 35 U.S.C. 154(b) by 566 days.

(21) Appl. No.: 13/461,281

(22) Filed: May 1, 2012

(65) Prior Publication Data

US 2013/0293361 A1 Nov. 7, 2013

(51) Int. Cl.
*G05B 15/02* (2006.01)

(52) U.S. Cl.
CPC .................................. *G05B 15/02* (2013.01)

(58) Field of Classification Search
CPC .............................. G05B 11/01; G05B 15/02
USPC ............................................ 340/12.28, 5.71
See application file for complete search history.

(56) References Cited

U.S. PATENT DOCUMENTS

| | | | |
|---|---|---|---|
| 3,590,271 A | 6/1971 | Peters | |
| 3,971,028 A | 7/1976 | Funk | |
| 4,249,162 A | 2/1981 | Nakamura | |
| 4,329,678 A | 5/1982 | Hatfield | |
| 4,355,309 A | 10/1982 | Hughey et al. | |
| 4,529,980 A * | 7/1985 | Liotine et al. | 340/9.16 |
| 5,844,516 A | 12/1998 | Viljanen | |
| 6,120,262 A | 9/2000 | McDonough et al. | |
| 6,630,894 B1 | 10/2003 | Boyd et al. | |
| 6,700,310 B2 | 3/2004 | Maue et al. | |
| 7,019,241 B2 | 3/2006 | Grassl et al. | |
| 7,085,534 B2 | 8/2006 | Bentley | |
| 7,274,117 B1 | 9/2007 | Viola et al. | |
| 7,576,647 B1 | 8/2009 | Mudge | |
| 2002/0077077 A1* | 6/2002 | Rezvani et al. | 455/410 |
| 2004/0067741 A1* | 4/2004 | Fei et al. | 455/192.1 |
| 2004/0174287 A1 | 9/2004 | Deak | |
| 2005/0184854 A1* | 8/2005 | Mullet et al. | 340/5.22 |
| 2006/0255961 A1* | 11/2006 | Hofer et al. | 340/825.22 |
| 2007/0176788 A1 | 8/2007 | Mor et al. | |
| 2008/0068126 A1* | 3/2008 | Johnson et al. | 340/3.5 |
| 2009/0195407 A1* | 8/2009 | Nakano et al. | 340/825.69 |
| 2010/0070100 A1 | 3/2010 | Finlinson et al. | |
| 2011/0272261 A1 | 11/2011 | Johnson et al. | |

OTHER PUBLICATIONS

Lightning Switch product web page, Apr. 18, 2011.

(Continued)

*Primary Examiner* — Edwin Holloway, III
(74) *Attorney, Agent, or Firm* — Dinsmore & Shohl LLP

(57) ABSTRACT

A wireless remote control system provides very low power operation and automatic addressing. In one disclosed example, the remote-control transmitter is battery operated, the receiver is powered from the AC line, and the system functions as a remotely operated switch to control lights or other devices or appliances. Battery life is extremely long, limited only by corrosion and other shelf-life issues. The transmitter is automatically programmed by a receiver using a very short range auxiliary signaling system when the transmitter is brought into close proximity to a receiver. The auxiliary signaling system transfers operational parameters from the receiver to the transmitter, enabling the transmitter to operate with the correct codes and on the correct frequency. Multiple switch transmitters may control a single operating device, and so that remotes can be added arbitrarily. Once programmed, the transmitter sends out a repetitive, unitized message in a continuous sequence to control the receiver.

12 Claims, 8 Drawing Sheets

(56) References Cited

OTHER PUBLICATIONS

Illumra Self-Powered Wireless Controls product page (date unknown).
Leviton product brochure (date unknown).
Philips Ledalite, Airwave Wireless Controls web page, Jan. 15, 2013.
Kanellos, M., Wireless Light Switches and Better LEDs: NXP's Green Plans, Sep. 29, 2010.
Science Scene—Wireless Light Switches, Mar. 1, 2010.
Carnett, J., The Green Dream: A Wireless Lighting System Makes Electrical Switches Portable, Popsci.com, Feb. 26, 2010.

* cited by examiner

DATA = 1 - CHANGE POLARITY
DATA = 0 - SAME POLARITY (UHF SWITCH RECEIVER, CON'T)

(TRANSITION-BASED
1-KPOINT COMPLEX
CORRELATOR)

WIRELESS REMOTE WITH CONTROL
CODE LEARNING

FIELD OF THE INVENTION

This invention relates generally to wireless remote control and, in particular, to a system wherein a transmitter is automatically programmed by a receiver.

BACKGROUND OF THE INVENTION

There are many systems wherein electrical power is hard-wired to a load and the switch(es) used to control that load. One example is conventional room lighting, wherein high-voltage, high current wiring is routed to fixtures, outlets and to wall switches. This is wasteful in terms of installation costs and raw material, since heavy gauge electrical conductors such as copper really need only be routed to the load and not the switch.

Recognizing this, wireless switches have been developed to turn lights on and off via remote control. Both hand-held and wall-mounted transmitters have been devised to control single loads and other devices. A problem with existing wireless switches is that they tend to be battery operated and the batteries tend to wear out. This is a concern, especially with functions such as lighting, where users have come to expect long-term reliability. To avoid batteries, self-powered solutions have been developed. These devices typically use a piezoelectric transducer which converts the mechanical action of a pushbutton or rocker switch into sufficient electrical energy to power a transmitter.

There are clear drawbacks with existing wireless switches. First, to be reliable (useful) an addressing scheme is needed. Without an addressing scheme, complex installations with multiple transmitters and receivers cannot be implemented due to interference. Frequent operation increases the likelihood of interference. Existing wireless switches either use transmitters and receivers which are factory set to communicate only with one another, or they use manual, user programming with switches or mechanical implements. Factory-set units are problematic in that replacement or additional system components, if available, must be somehow programmed in advance. Switches and keypads for programming raise production costs and require user training with instructions that can be misplaced, and programming implements like keys can be lost.

A switch transmitter also needs to have some energy to store an address. Self-powered switches must generate sufficient electrical power to reliably recall an addressing code and a function command. More sophisticated units at least temporarily power up sufficient electronics to generate and transmit a control code to address a specific receiver, but these take considerable physical effort to operate. Given the cost of implementing a suitable piezoelectric transducer and the circuitry needed to buffer and stabilize the power generated, it would be more advantageous to use a battery if consumption can somehow be kept to a minimum.

Remote operating devices such as garage door operators use battery-powered transmitters which send coded signals to remote receivers. As is well known, the batteries in these transmitters are exhausted after months or a year. As with existing light switches, the codes are assigned at the time of manufacture or the time of installation. Wireless light switches need longer assured battery life, since battery replacement is likely to be very inconvenient. Additional requirements for a proper wireless remote switch include negligible probability of cross-actuation, ease of manufacturing, and interchangeable parts.

SUMMARY OF THE INVENTION

This invention resides in a wireless remote control system with very low power operation and automatic addressing. The transmitter is automatically programmed by a receiver using a very short range auxiliary signaling system when the transmitter is brought into close proximity to a receiver. The auxiliary signaling system transfers operational parameters from the receiver to the transmitter, enabling the transmitter to operate with the correct codes and on the correct frequency. Multiple switch transmitters may control a single operating device, and so that remotes can be added arbitrarily.

Once programmed, in the preferred embodiment the transmitter sends out a repetitive, unitized message in a continuous sequence to control the receiver. The preferred embodiments use unitary command encoding, meaning that the command(s) is/are integrated into the address for superior efficiency. The unitized messages are complex patterns which can be correlation detected with circular correlation circuitry in the receiver. The receiver continuously captures and processes the relevant portion of the RF spectrum. The use of correlation detection offers a very high immunity to interference, especially narrow-band interference. The system also preferably incorporates processing for frequency offsets due to aging. The system is extremely resistant to noise interference and, in the preferred embodiment, is 27 db orthogonal to cross codes.

An electrical power control system constructed in accordance with the invention comprises at least one transmitter unit and a receiver unit. The receiver unit includes a power control device operative to route electrical power from a source to a load in response to an encoded command message received from the transmitter unit. The receiver further includes a device for storing one or more operational parameters enabling the command from the transmitter unit to be recognized, decoded and executed by the receiver unit. A wireless, short-range transmitter is operative to program the transmitter unit by communicating the parameters to the transmitter unit when the transmitter unit is positioned is in close physical proximity to the receiver unit.

A radio-frequency (RF) receiver receives the encoded command message in modulated form from the transmitter unit, and circuitry is included in the receiver unit for demodulating and decoding the command from the encoded message for execution by power control device. The transmitter unit includes a short-range receiver for receiving the parameters from the short-range transmitter of the receiver unit and a memory for storing the parameters received. A manually operated user control is operative to generate a command. Circuitry encodes the command into an encoded command message, and the encoded command message is modulated. An RF transmitter is operative to transmit the modulated, encoded command message to the receiver unit using the parameters received and stored by the transmitter unit during programming.

In one disclosed example, the transmitter is battery operated, the receiver is powered from the AC line, and the system functions as a remotely operated switch to control lights or other devices or appliances. Battery life is extremely long, limited only by corrosion and other shelf-life issues.

DETAILED DESCRIPTION OF THE INVENTION

This invention resides in a wireless remote control system with very low power operation and wherein a transmitter is automatically programmed by a receiver. For wireless light switch applications, the receivers inherently have adequate operating power, since they are connected to the AC line. On the other hand, the transmitters are by definition nearly powerless, since they either use a small battery expected to last a long time, or have no such battery and use another energy source (e.g. a moving magnet on a switch lever, or a piezoelectric transducer as a charge source). The circuits disclosed herein enable battery-powered operation over extended periods of time.

The switch receiver emits a localized, short-range signal which identifies its control code, and allows for frequency synchronization. A wireless switch transmitter, if placed in close proximity to the switch receiver, receives the control code and frequency information, and inform the user/installer that it has been suitably coded/calibrated. Using the 125 KHz frequency normally used by short distance RFID devices, for instance, it is possible to automatically assign an address to a switch transmitter. This could also be done with short range AC electrostatic or capacitive coupling. Whether this is achieved by contact or proximity is a detail. This invention preferably uses VLF magnetic induction which also can supply power to the switch transmitter for its address loading or copying function. Alternatively, the address could be stored in flash memory or in battery-powered static RAM in the switch transmitter.

An example programming procedure for this would be to push a button on the un-programmed switch transmitter while holding it close to the switch receiver, and hear a beep or see an indicator light on the switch transmitter, signifying that it had acquired the code and frequency from the switch receiver. While a separate switch on the transmitter may be used for programming, in the preferred embodiment the user simply beings using the switch near the receiver until the receiver begins to control power, indicating that the transmitter has been programmed. The newly programmed switch would then be placed wherever it was needed, and tested in that location.

Figure 1A:
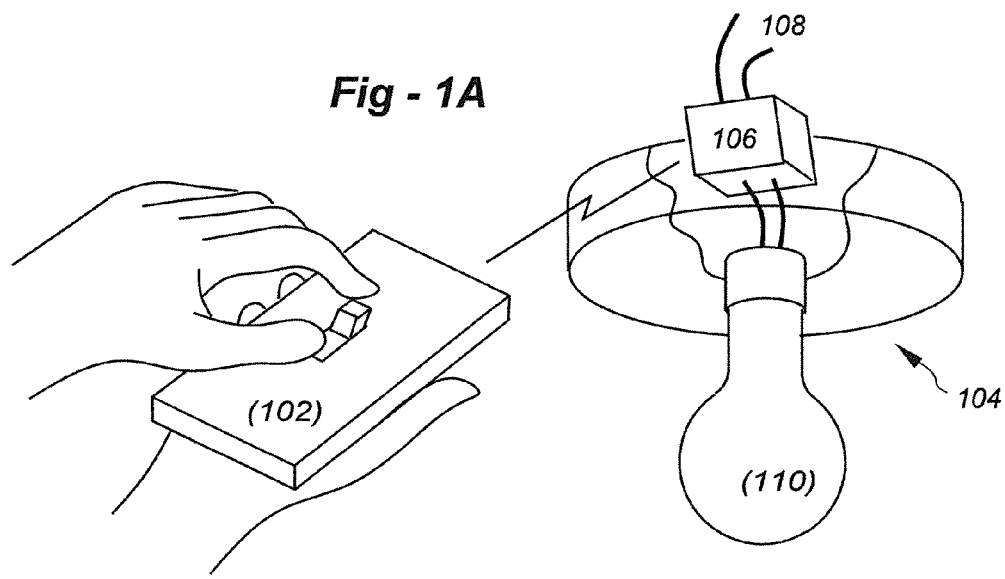
FIG. 1A is a simplified drawing which shows a user or installer operating a light switch near a light fixture for programming purposes.
Figure 1B:
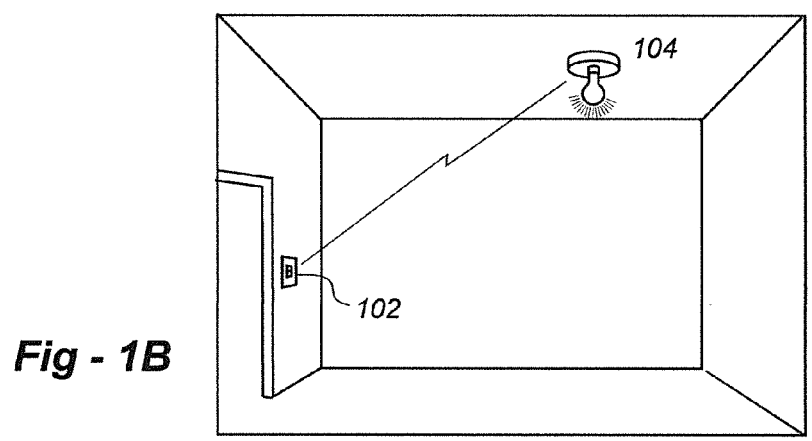
FIG. 1B is a drawing that shows the switch having been wall mounted, and now turns a fixture ON and OFF in the same way as a hard-wired unit.

FIG. 1A is a simplified drawing which shows a user or installer operating a light switch 102 near a light fixture 104 for programming purposes. The remote control receiver is depicted at 106, which makes contact to the AC line at 108 and a load such as light bulb 110. Any suitable housing may be used for the receiver, which connections being made with screw terminals, push-in connectors, and so forth. In FIG. 1B, the switch 102 has been wall mounted, and now turns the light 110 ON and OFF in the same way as a hard-wired unit. Three-way, four-way (and higher) switches are easily accommodated by simply programming multiple transmitters off the same receiver. Lamp dimming is accomplished with dimmer switch transmitters which send out desired dim level control codes on a periodic basis as described in further detail below.

Figure 1C:
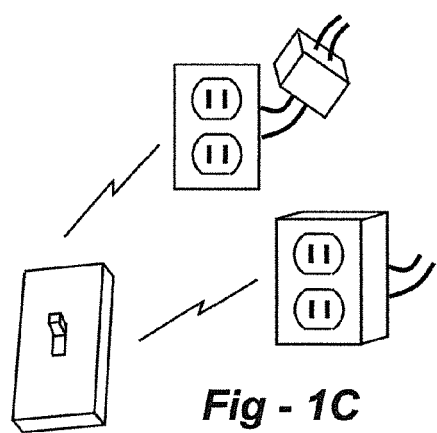
FIG. 1C shows different wall-outlet receivers.
Figure 1D:
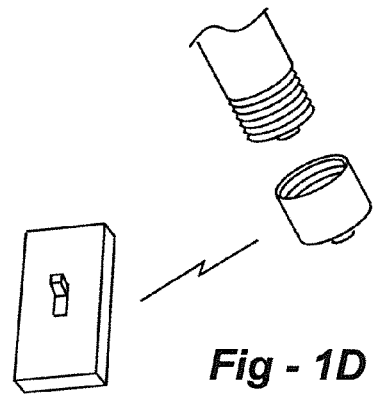
FIG. 1D depicts a receiver in the form of a threaded coupler.

The transmitter may use any type of manually operated control including toggle switches, slide switches or touch panels. The receiver can be used in a ceiling fixture (as shown in FIG. 1B), or may be used in a wall outlet (FIG. 1C), threaded coupler (FIG. 1D), or any other operational module. The transmitter may be provided in a thin housing to be mounted on a wall surface, or may have threaded tabs for installation like a conventional ON-OFF switch. Indeed, the transmitter need not be mounted at all, and may be housed in an enclosure for tabletop use, in a door jam to control a light for security purposes, on a key fob to control a light, garage door opener, or any other wireless remote control environment which would benefit from the automatic programming procedure which will now be described.

Transmitter Programming

Control/address code and frequency transfer from receiver to transmitter(s) is carried out using a completely separate and very short range (non-radio-wave) signaling apparatus and method. The size of the required address field is modest. The receivers need not have unique addresses, such that an 8-bit number is sufficient. In the preferred embodiment wireless induction in the 125 KHz range is used. As the field strength from a magnetic dipole diminishes as the inverse $3^{rd}$ power of distance, the association with proximate switches is very strong. This could also be done with ultrasound, say, which has a strong atmospheric attenuation increasing with frequency, and therefore an exponential diminution of signal strength with distance. Additional alternatives include AC electrostatic or infrared signaling, but these are not preferred choices.

Figure 2A:
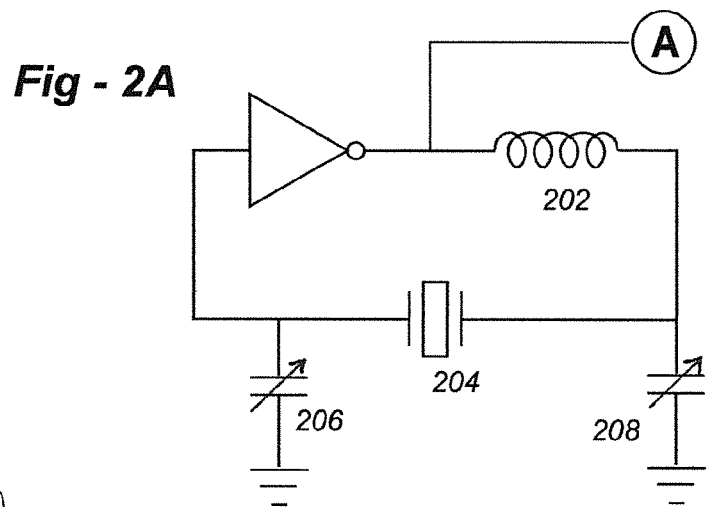
FIG. 2A is a schematic of an oscillator circuit using a quartz crystal.
Figure 2B:
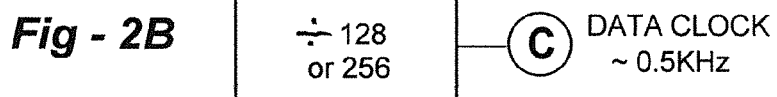
FIG. 2B is a block diagram showing divider circuits.
Figure 2C:
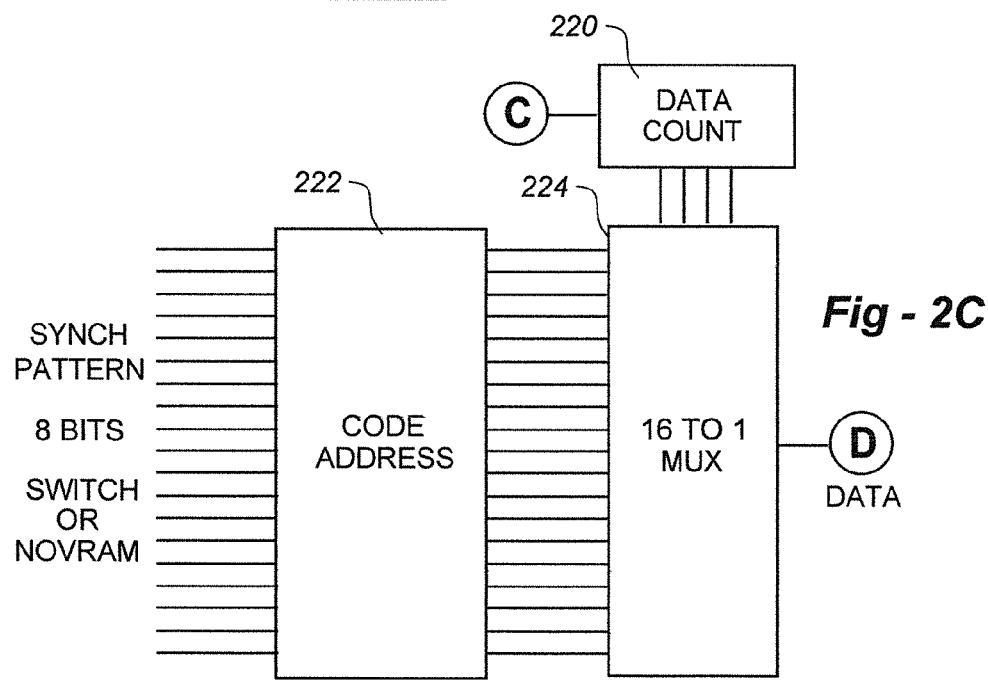
FIG. 2C illustrates code multiplexing.
Figure 2D:
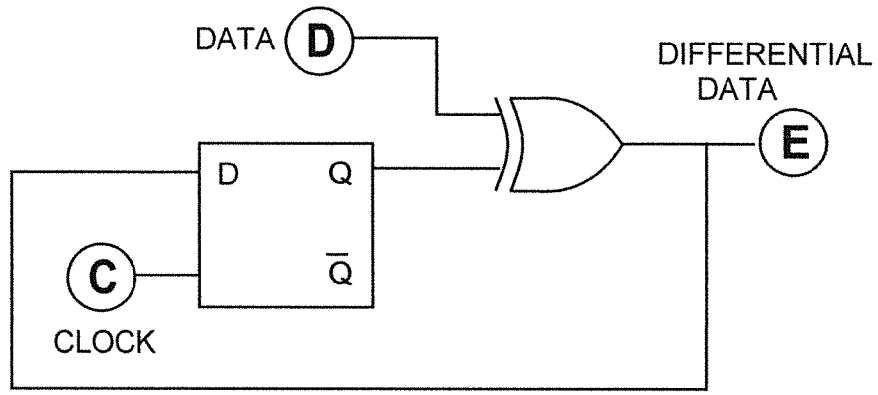
FIG. 2D depicts the conversion to differential data.
Figure 2E:
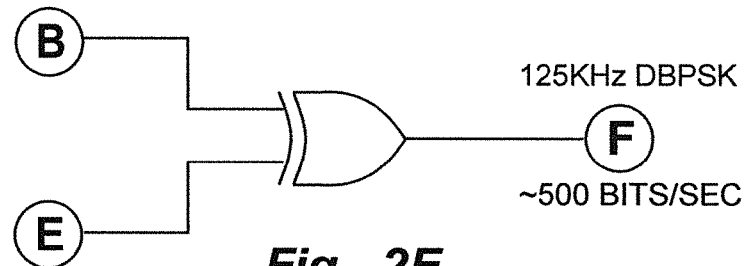
FIG. 2E shows the generation of a differentially encoded binary phase shift keying (DBPSK) data stream.

A simple implementation uses a coil 250 in the switch receiver as an AC magnetic field exciter illustrated in FIG. 2E. This magnetic field would have a carrier frequency which is linearly proportional and locked to the frequency of an internal resonator, using a quartz crystal 204 shown in FIG. 2A. Capacitors 206, 208, which are used for trim purposes, may be implemented as a factor-set, on-chip MIM capacitor array, or the like. Other high-Q devices may be used in lieu of a crystal. In theory, this could be locked to the frequency of an external reference, or even the power line frequency, but such approaches are less practical.

Figure 2F:
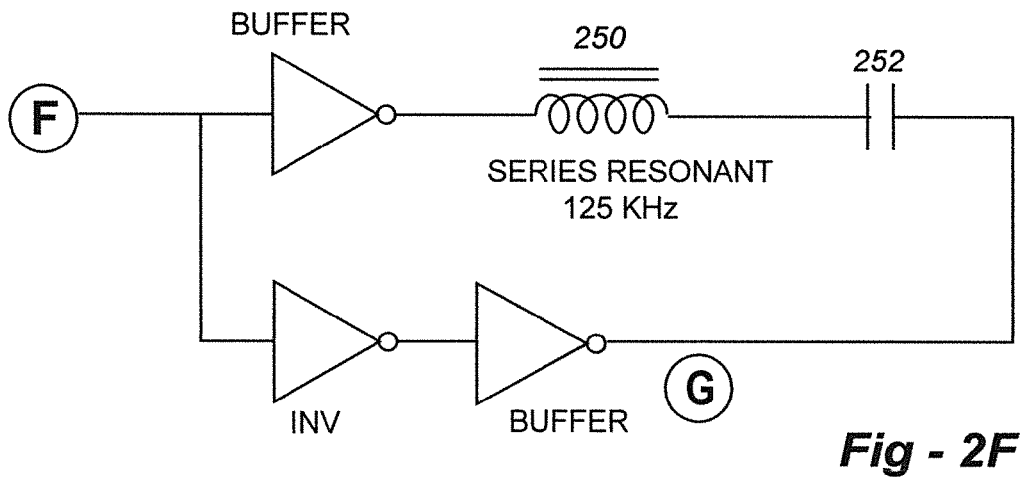
FIG. 2F illustrates the differential data being delivered to the exciter circuit that uses a coil as an AC magnetic field exciter.

As shown in FIG. 2B, the output of the oscillator which may, for example, have a frequency on the order of 4 megahertz, is fed to a divider 210 to produce a 125 KHz square wave. This signal may be divided down at 212 to produce a data clock for counter 220 shown in FIG. 2C. The control code and frequency pattern for the receiver may be stored in a switch bank, non-volatile memory (NOVRAM), flash or other memory type. The code(s) 222 are multiplexed at block 224 in FIG. 2C to produce a data stream which is converted to differential data by the circuit of FIG. 2D. The differential data is modulated by the circuit of FIG. 2E, then delivered to the exciter circuit of FIG. 2F.

The 125 KHz carrier frequency is modulated with a repeating address, so that the switch's address/access code can be obtained by a nearby switch transmitter. Presumably, the magnetic field making coil 250 would be resonated with some capacitance 252, reducing its power consumption for a given field strength. The recommended modulations for the local short range inductive signaling means include on-off keying (OOK), and BPSK or differential BPSK (DBPSK). These methods allow easy recovery of the carrier frequency. The signaling format may be synchronous or asynchronous, and forward error correction or parity may be useful.

Figure 3A:
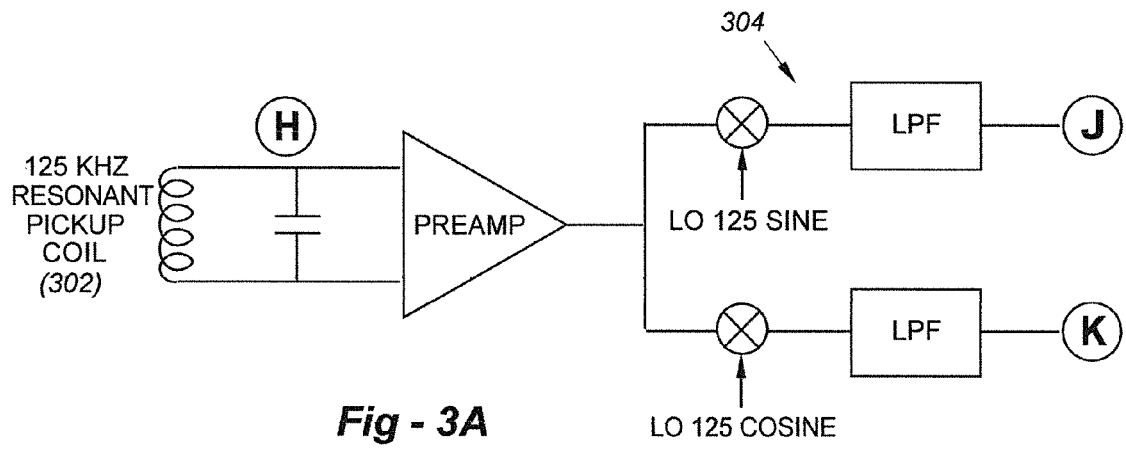
FIG. 3A shows the remote switch transmitter receiving the local field signaling using a resonated coil and a simple, low-frequency demodulator.
Figure 3B:
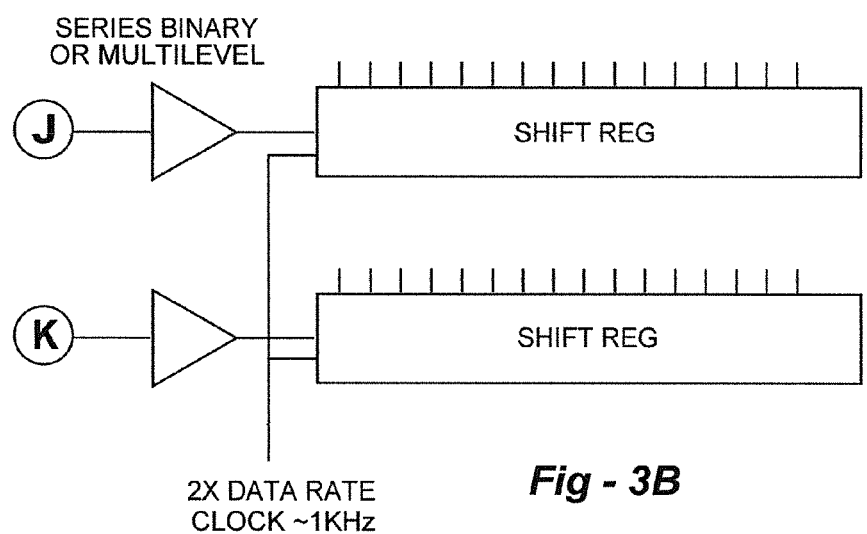
FIG. 3B is a simplified diagram that shows a low-speed pattern detector circuit.
Figure 3C:
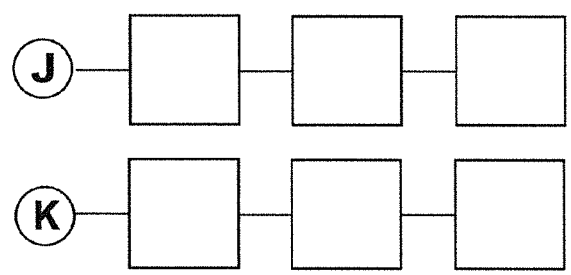
FIG. 3C depicts an alternative embodiment using analog delay or switched capacitors.

Now making reference to FIG. 3A, the remote switch transmitter receives the local field signaling using a resonated coil 302 and some form of simple, low-frequency demodulator circuit readily apparent to those of skill in the art. As mentioned, code reception may be gated by a "learn" button on the switch receiver. One embodiment of a low-speed complex pattern detector is depicted in FIG. 3B; an alternative embodiment using analog delay or switched capacitors is provided in FIG. 3C. A low-speed pattern detector and microprocessor may alternatively be used for synch pattern and address. Note that the roll rate@125 KHz would be about 1 Hz max, so phase is substantially stationary during the data pattern. Alternative (J), (K) processing may use a S/H analog delay or switched capacitors. The sign of the delay modulator for DBPSK is $(J_x * J_{x-2} + K_x * K_{x-2})$ if the signal is like itself; −2 samples that is a zero, otherwise a "1." While FIG. 3B does not illustrate the pattern matcher, this may be implemented with a comparator as a separate device or microcomputer code, since this operation occurs at relatively low speed. As mentioned, the pattern comprises a unitized command message containing both the command (ON/OFF/MORE/LESS) and address of the receiver unit. Note that it is not critical that the remote switch transmitter receives a unitary code. It broadly receives a code, perhaps embodying a command choice (on/off versus dim), and automatically measures its frequency difference with respect to the switch receivers clock.

A carrier tracking loop measures carrier frequency to within 0.2 ppm in one second. The address of the switch can be demodulated in much less time. Given a switch transmitter with a low frequency local oscillator locked to its crystal reference, then the carrier phase roll rate can be readily measured. If phase is measured to 5 degrees, then in one second at 125 KHz, relative frequency may be determined to within 1/(72*125000), or 0.111 ppm. This measurement is stored in the switch transmitter, and is used to set its radio frequency transmitter to precisely the switch receiver's carrier frequency. Thereafter, the devices will drift with respect to each other as crystals age, but they will be set very precisely at the outset.

Since most devices share an ambient temperature, the overall frequency error will be the result of crystal drift over time. About 1 ppm/year may be expected from ordinary crystals, such that a relative drift rate of 2 ppm/year is a reasonable limit. If a message (explained later) is to be coherently demodulated as a single piece, then the mutual frequency error should not exceed an amount corresponding to a half carrier phase rotation over the message length. If a message is 511 symbols long, then we have about 1/1000 of a carrier cycle per symbol. At a symbol rate of 500,000/second, then we have a maximum allowable discrepancy of 500 Hz. This corresponds to about 1.2 ppm at 433 MHz. Thus, if fully coherent demodulation is used, there will be a few frequency choices in the switch receiver. These would be spaced at mutual nulls. Implementing this would give trial frequencies separated by about 1 Khz. If there are five such choices, then a maximum offset of +/−2.5 Khz could be achieved, which is about +/−6 ppm. This should be adequate even for poor quality crystals, given the precision initial calibration.

Normal Operation Following Programming

In the preferred embodiments, the high-frequency control signals (i.e., ON/OFF) from the transmitter are received without synchronization. The signals should be as distinct from each other as possible, but not blocked by other signals sent at the same time, since there is no coordination between neighbors. In order to do this, the signals should utilize a wide bandwidth to achieve high-rate signaling. An address space encompassing a few hundred possibilities is needed to minimize the chance of cross actuation.

It is important to encode switch commands so that they are as brief as possible, and as low in power as possible, in order to minimize energy requirements and to minimize potential interference. To do all of these things, the preferred embodiment utilizes optimal sequence receivers (correlators), which are practical only for short messages. Using as much available bandwidth as possible, but operating in the 433 MHz band (available world-wide), we have about 1 MHz to work with. To optimize these things further, we propose the use of complex domain signals, specifically QPSK.

Figure 4:
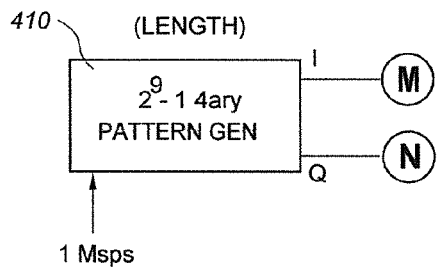
FIG. 4 illustrates a quaternary pattern generator that produces I and Q signals for the circuit of FIG. 4B.

Schematic/block diagrams for the RF transmitter are presented in FIG. 4; receiver diagrams are given in FIG. 5. The switch transmitter may be extremely simple, including a sequence generator implemented with a few dozen logic elements, minimal memory, a variable-phase rotator, and a quadrature transmitter. A microcontroller may be included to allow for functional customization. The switch receiver incorporates a crystal clock, a low-frequency sequence transmitter, a modest amount of memory, a 433 MHz-band receiver and a circular correlator. This device would also benefit from a simple microcontroller.

Figure 4A:
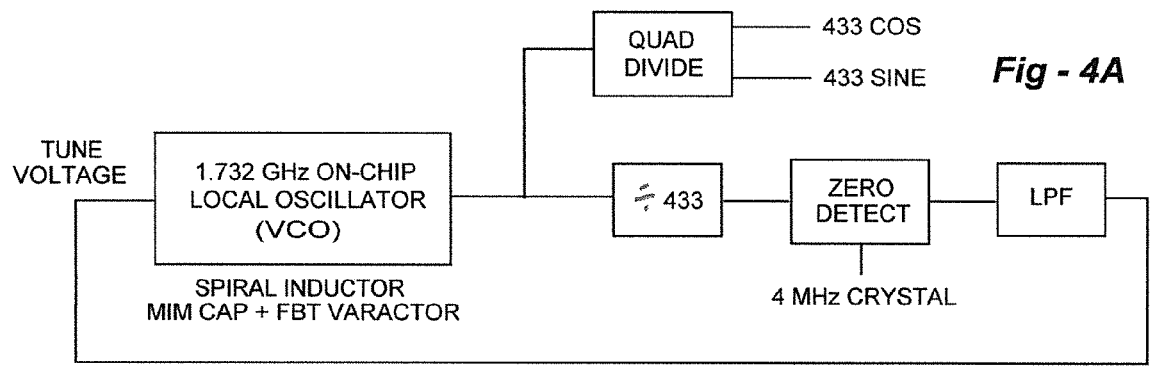
FIG. 4A is a block diagram of a 1.732 GHz local oscillator used to generate 433 Mhz sine and cosine waveforms.
Figure 4B:
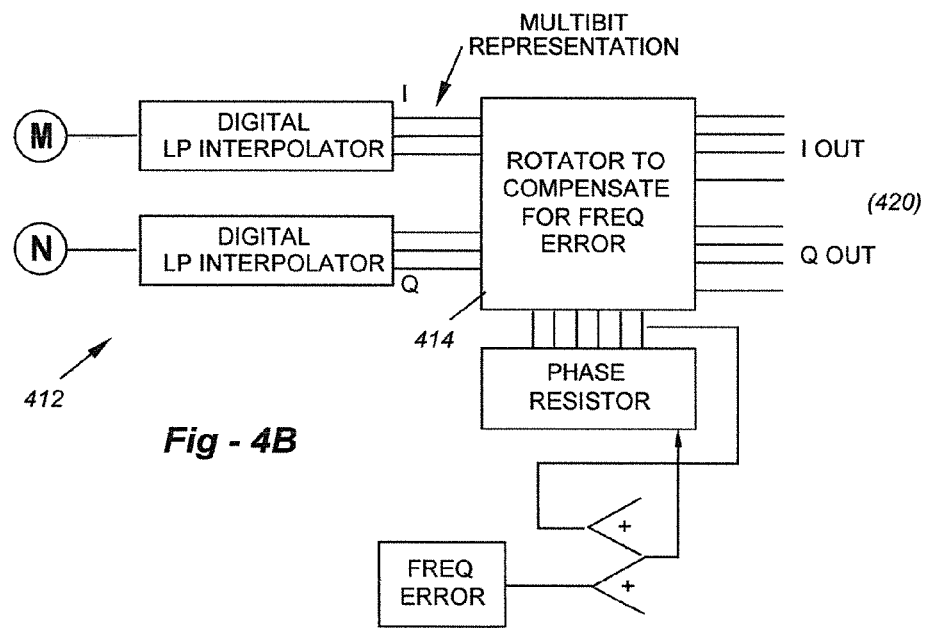
FIG. 4B illustrates a quaternary pattern generator producing I and Q signals which are digitally interpolated and routed to variable-phase rotator which compensates for frequency error and generates real and imaginary output signals.
Figure 4C:
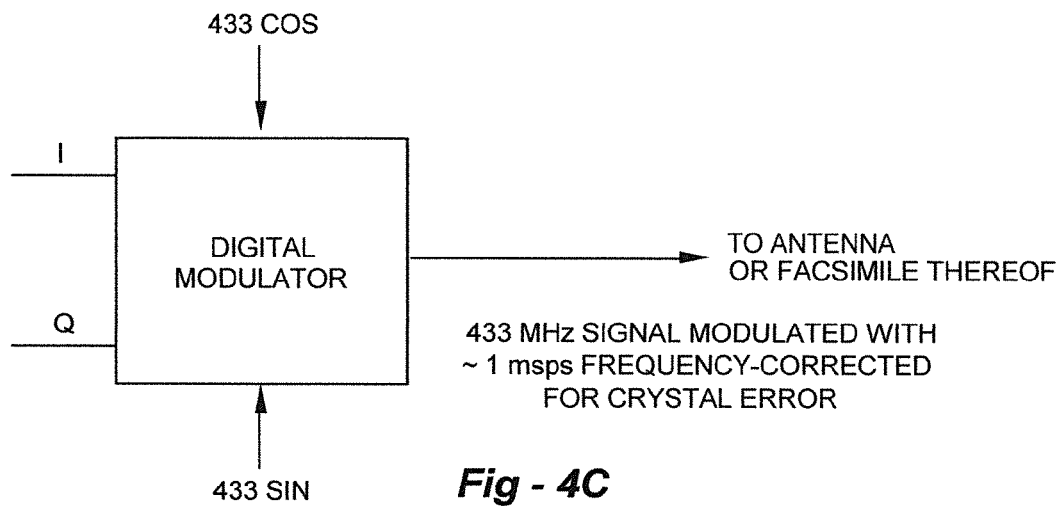
FIG. 4C shows how the complex, unitary pattern generated by the transmitter is modulated prior to broadcast.

FIG. 4A is a block diagram of a 1.732 GHz local oscillator used to generate 433 Mhz sine and cosine waveforms used in both the RF transmitter and receiver. In FIG. 4B quaternary pattern generator 410 produces I and Q signals which are digitally interpolated at 412 and routed to variable-phase rotator 414 which compensates for frequency error and generates real and imaginary output signals 420. FIG. 4-B shows a complex low pass interpolator, normally implemented in a polyphase (sliding coefficients) structure. This is done to convert a 511 symbol pattern smoothly to a 1024 sample signal (or any multiple of 1024 points like 2048 points), so that each of 511 original symbols is converted to 1024/511 samples or to 2048/511 samples, etc. FIG. 4C shows how the complex, unitary pattern generated by the transmitter is modulated prior to broadcast.

Figure 5A:
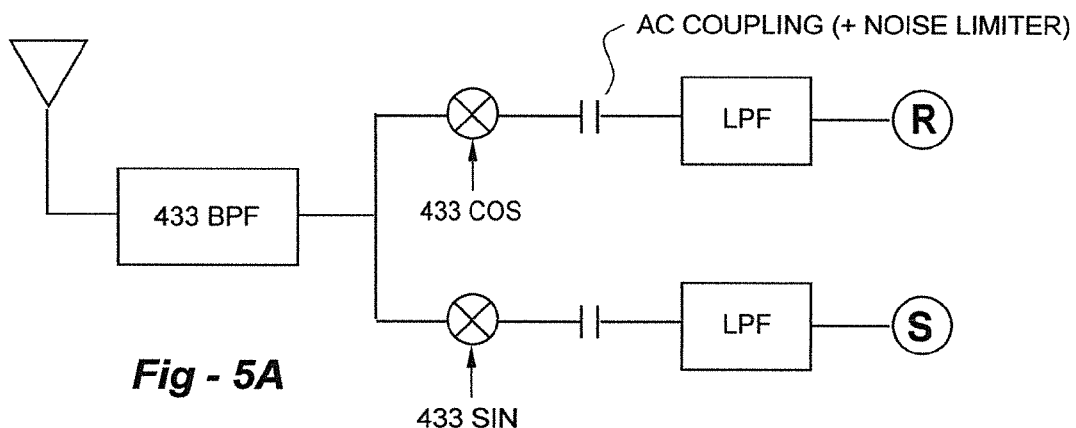
FIG. 5A shows the input to the receiver including bandpass filtering, 433 MHz multipliers and low-pass filters.
Figure 5B:
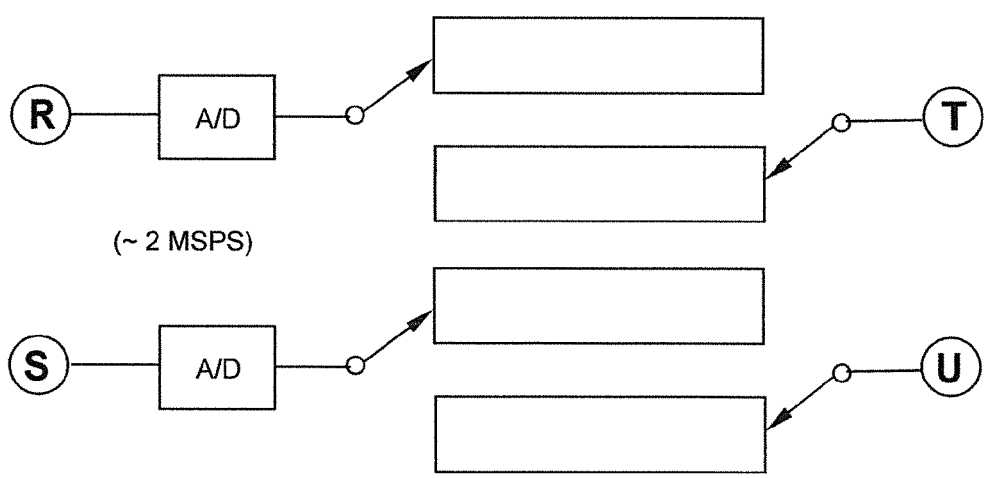
FIG. 5B depicts how the real and imaginary analog signals are converted to the digital domain in the diagram of FIG. 5B and sampling blocks.
Figure 5C:
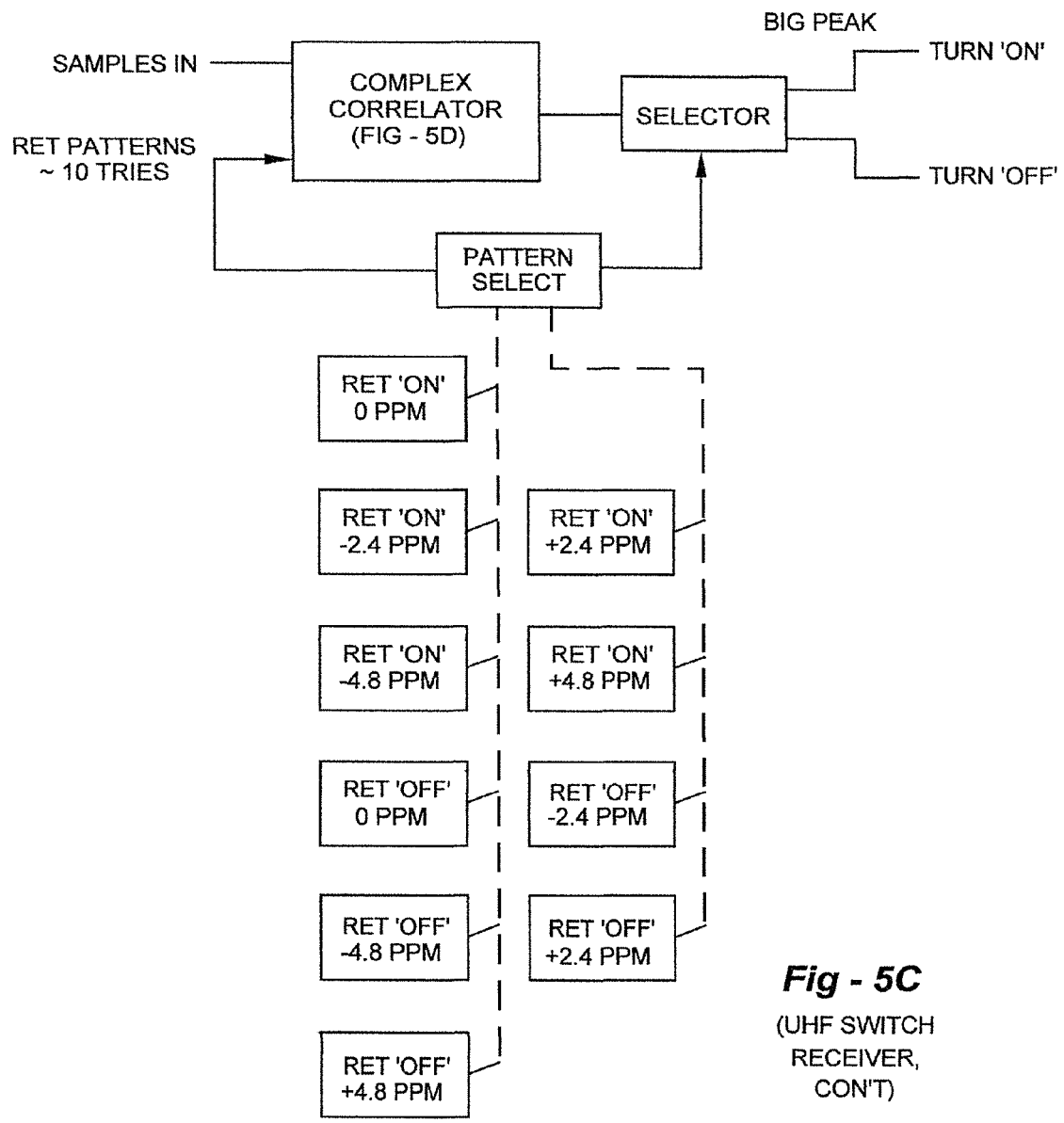
FIG. 5C is a block diagram that illustrates how reference frequency domain representations are complex conjugate multiplied by the transform of incoming signals so that the product can be inversely transformed, giving a circularly correlated output shown.
Figure 5D:
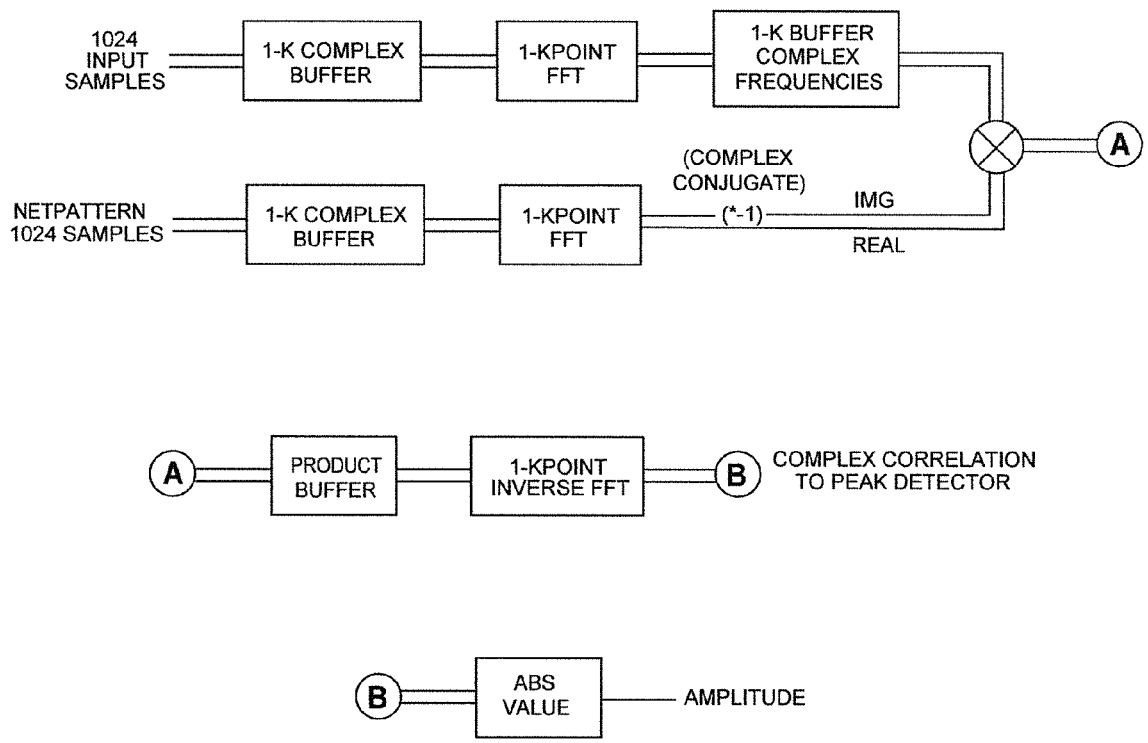
FIG. 5D is a detail diagram of the correlator of FIG. 5C.

FIG. 5A shows the input to the receiver including bandpass filtering, 433 MHz multipliers and low-pass filters. The real and imaginary analog signals are converted to the digital domain in the diagram of FIG. 5B and sampling blocks. Messages are encoded in a unitary fashion, so that for 256 different addresses, we have 512 different messages, with an ON (or increase) message and an OFF (or decrease) message for each address. The correlators are preferably transform-based, and in the example of a 511 complex symbol pattern, would use 1024-point sampling and transforms. The chosen reference pattern in the switch receiver would be transformed to produce 5 complex frequency domain representations, separated by 1 turn from their nearest neighbors. These reference frequency domain representations would be complex conjugate multiplied by the transform of incoming signals so that the product can be inversely transformed, giving a circularly correlated output shown in the block diagram of FIG. 5C. FIG. 5D is a detail diagram of the correlator of FIG. 5C.

Even in very dated silicon technology, such a transform based circular correlator can be implemented in less than 10 square millimeters. The sequences, preferably similar to those described as set "A" in the paper by Bortas, Hammons, and Kumar have, for a length of 511, a 27 db spreading gain, and a peak correlation of −27 db for cross codes of the same type (See, *IEEE Transactions on Information Theory*, May 1992). The correlator here would require, for 5 frequency bins, a single input transform, and 5 inverse transforms. We assume here that the reference transforms are ready in advance, using a time-memory tradeoff. These sequences satisfy the Welch and Sidelnikov bound, so that they are as different from each other as possible for 2 dimensional signals of the stated length and population. For circular correlation processing, the messages should be sent at least twice, so that no matter the relative timing of switch senders and the switch receiver, any transmitted message will be captured as a complete sequence.

The switch transmitters need to have a permanent independent power source. To achieve this with a small battery, we need to use a battery which has negligible self discharge and which has adequate capacity for the task. The most severe duty would likely be for switches in "dimmer mode" since these would need to send repeated messages. If a dimmer transaction consists of 5 messages (a reasonable guess), and if the dimmer is used 5 times daily, then we have 25 messages per day. If transactions require a few, say 2 milliseconds of transmit time and 2 milliseconds more of warm-up, then a transmitter may be active for 100 milliseconds per day worst case. This, if circuitry needed 5 milliamperes, would be about 0.5 milli-coulomb per day. A small watch battery has a capacity of 70 milliampere hours, or 250 coulombs. A wireless switch of the type described herein can therefore be built, particularly if the duty cycle of any high speed processes is minimized.

If the system is to be reliable, the signals from the transmitters need to have adequate range and be able to penetrate interior or—occasionally-exterior wall materials. Consequently, the signals from the transmitters need to be strong enough to travel some distance. In that case, the transmitted signal from a particular switch transmitter "A" could spuriously cause switch receiver "B" to be triggered unless effective addressing means are employed. A range of perhaps 30 meters at most is needed. The receiver is conveniently always monitoring, so transmissions can be brief. Minimum transmit energy (transmit time) is important to long-term operation. This means that lower frequencies are preferred, for their larger omni-directional antenna capture areas. On this basis, the 433 MHz band is preferable to the 2.4 GHz region.

For most light-control applications there four basic system commands, namely ALL (i.e., "ON"); NONE (i.e., "OFF"); MORE (i.e., "reduce dim"); and LESS (i.e., "increase dim"). These four commands are selected in part by the nature of the controlled device. The commands could be code words combined with the address acquired from the receivers near field broadcast. In essence, we are adding 1 or 2 bits to the encoded information. It is desirable, in order to conserve energy, to require no synchronization, and to allow instant decoding. This is done well with sets of sequences which are maximally orthogonal from each other. If the 433 MHz ISM band spanning 433.05-434.79 MHz is used, then a 500,000 chip per second signal might be used. A transmit time of 2 milliseconds could cover 511 chips, repeating the message. If a transmitter operated for 2 milliseconds, and warmed up for 2 milliseconds this might use (at a very low power output) perhaps 50 microjoules. A lithium coin cell battery may have a capacity of 75 mah, which is about 220 mw hours, or 700 joules. This would be enough, in theory, to send a command some 140 million times. This kind of performance is in some respects overkill, since a power switch is never operated more than a hundred thousand times. A set of 511 chip long Welch bound achieving patterns allows 512 different messages as a 9-bit code.

These messages would be sent twice in our example. Were a correlation detector used, this code would give 27 db spreading gain, and could be detected about 15 db below the wideband noise floor. If 1 bit was assigned to the action requested, then a set of 256 addresses could be used. The thermal noise level across a 500 Khz bandwidth is approximately −117 dbm, which means that absent other noise, a 1 milliwatt transmitter could be barely detected by a noise-free receiver at a level of −132 dbm. This corresponds to a loss of 132 db for a 1 milliwatt source. A cheap low performance receiver operating in a noisy world might reduce the permissible loss to 120 db. In free space, at 433 Mhz, this is a distance of miles which is obviously too high. Thus, the transmit power level can and should be reduced to microwatts.

The transmitter power level should be set so that distances of 30 meters maximum are achieved without spuriously triggering far distant receivers. In this we are aided somewhat by phenomena like 2-ray fading, which cause $4^{th}$ power attenuation of distant signal sources. We want the free space loss here to allow transmissions to span 30 meters with maybe a factor of 20 db to spare. In the case of 30 meters and 433 MHz, we have 20 log 10(distance) is 20*log 10(0.03)=−30 db. For 433 mhz, 20 log 10(433)=52 db. Therefore, the free space loss is about 32−30+52 db=54 db. This means that a 20 db fade margin calls for a 74 db path loss. If the required receive power is about −117 dbm with the aforementioned noisy receiver, then the indicated radiated power is about −63 dbm or around a nanowatt.

Here is where the low-frequency, near-field communication channel is useful again. By having the switch receiver emit its code on a nominal 125 Khz carrier, with BPSK, DBPSK, OOK or AM modulation, we can recover data and the carrier frequency. Given that the receiver and transmitters each have an inexpensive crystal for setting both the 125 KHz and 433 MHz frequencies, we can have the switch transmitter acquire the crystal frequency from the switch receiver. Assuming we read phase difference to, say 10 degrees of angle, and an observation interval of 1 second, then we can have the switch transmitters low frequency near field receiver measure the frequency of the 125 KHz carrier to an uncertainty of about 1 part in 4 million. If this calibration is applied to the switch transmitter's frequency when it send messages to the switch receiver, then the deleterious effects of initial frequency offset error are effectively removed. In this way, we need analyze only a frequency range corresponding to temperature variation and crystal aging. This adjustment can be implemented in either analog or digital form. Analog compensation would be done with a crystal trim capacitor, driven by a capacitor DAC. Digital compensation would be done using a digital phase rotator (cordic or other).

If we now make the reasonable and cautious estimation that the effects of temperature and crystal aging for spans of years between two mutually adjusted crystals is about 12 ppm peak to peak (+−6 ppm relative), then we need to evaluate 5 values of frequency offset in a switch receiver.

If we use a transform receiver, that receiver would need to perform the order of 10 transforms to do a decode across frequency error. If these were 1 k point transforms, then if they each needed 20 microseconds, the process would take about 120 microseconds. This presumes a receiver capture time of about 2 milliseconds, and a processing time of the same. To be certain that the power switch receiver will capture a complete transmission, the transmission will need to span two periods, or about 2 milliseconds. This is not a problem. The transmitters will be very simple, as they consist of a low frequency code sensor, which can be capacitive or inductive, and a very straightforward transmitter built from a PN shift generator and a complex modulator.

The transmitter needs to have a small amount of either novram or low-leakage sram, which is particularly easy to implement in large-geometry CMOS processes. The code generator is maybe 3 dozen flops and some 2 bit arithmetic elements. The rest of the transmitter is also very simple, since good spectral purity is unnecessary at the extremely low radiated power level. This could consist of phase inverting elements and a quadrature RF source. The RF source is readily built with a 4*carrier on-chip oscillator, and quadrature dividers. The TX on chip oscillator would be locked to a crystal oscillator with the crystal the only external part. The devices would be factory trimmed when the batteries are installed, unless novram is installed. A coarse temperature compensation would be included, to keep frequencies close to nominal.

The frequency of the receiver will be imparted to each transmitter when the receivers are brought into proximity to acquire their addresses. This will require only a few seconds of exposure to set up frequencies to within 1 ppm. Thereafter, we deal with aging and temperature. Compromise temperature compensation and evacuated crystals should hold these to about +/−5 ppm. This reduces the computation burden and allows the processing of 2 or 4 codes per command. If the temperature span is the range of plausible human occupancy, that is about 10 to 40° C., there is not much temperature correction of concern. The transmitters can use purely digital frequency adjustment if desired:

We claim:
1. An electrical power control system, comprising:
a transmitter unit and a receiver unit, the receiver unit including:
a power control device operative to route electrical power from a source to a load in response to an encoded command message received from the transmitter unit,
a device for storing one or more operational parameters enabling the command from the transmitter unit to be recognized, decoded and executed by the receiver unit, the operational parameters including the frequency to be used by the transmitter unit in communicating with the receiver unit;
a wireless, short-range transmitter operative to program the transmitter unit by communicating the parameters to the transmitter unit when the transmitter unit is positioned is in close physical proximity to the receiver unit,
a radio-frequency (RF) receiver for receiving the encoded command message in modulated form from the transmitter unit;
circuitry for demodulating and decoding the command from the encoded message for execution by power control device, and wherein the transmitter unit includes:
a short-range receiver for receiving the parameters from the short-range transmitter of the receiver unit,
a memory for storing the parameters received,
a manually operated user control operative the generate a command,
circuitry for encoding the command into an encoded command message,
a modulator for modulating the encoded command message, and
an RF transmitter operative to transmit the modulated, encoded command message to the receiver unit using the parameters received and stored by the transmitter unit during programming.

2. The system of claim 1, wherein the parameters include the address of the receiver unit.

3. The system of claim 1, wherein the short-range transmitter uses wireless magnetic induction.

4. The system of claim 1, wherein the RF frequency is in the 433 MHz band.

5. The system of claim 1, wherein the transmitter unit sends out a repetitive, unitized command message in a continuous sequence to control the receiver unit.

6. The system of claim 1, wherein:
the message is encoded as a complex pattern; and
the receiver unit includes circular correlation circuitry to correlation detect the encoded message.

7. The system of claim 1, wherein:
the command message is encoded as a complex pattern;
the encoded command message is modulated and demodulated using quadrature-phase-shift keying (QPSK); and
the receiver unit includes circular correlation circuitry to correlation detect the encoded message.

8. The system of claim 1, wherein:
the power control device is operative to route electrical power from an alternative current (AC) source to a light; and
the transmitter unit is configured as a light switch.

9. The system of claim 1, wherein:
the power control device is operative to route electrical power from an alternative current (AC) source to a light; and
the transmitter is configured as a light dimmer.

10. The system of claim 1, wherein:
the power control device is operative to route electrical power from an alternative current (AC) source to a light;

the transmitter unit is configured as a light switch; and
the manually operated user control is operative to generate an ON command to route all power form the source to the load and an OFF command to route no power form the source to the load.

11. The system of claim 1, wherein:
the power control device is operative to route electrical power from an alternative current (AC) source to a light;
the transmitter unit is configured as a light switch;
the manually operated user control is operative to generate a reduce dim command to route more power from the source to the load and an increase dim command to route less power from the source to the load.

12. The system of claim 1, wherein the transmitter unit includes circuitry for measuring frequency error associated with the short-range receiver and using that frequency error to pre-compensate the frequency of the RF transmissions.

* * * * *